(12) United States Patent
Tarlton (10) Patent No.: US 7,771,070 B2
(45) Date of Patent: Aug. 10, 2010

(54) ILLUMINATION SOURCE

(75) Inventor: Peter B. Tarlton, Red Bank, NJ (US)

(73) Assignee: Lunabrite, Inc., Mountain Lakes, NJ (US)

( * ) Notice: Subject to any disclaimer, the term of this patent is extended or adjusted under 35 U.S.C. 154(b) by 31 days.

(21) Appl. No.: 12/168,371

(22) Filed: Jul. 7, 2008

(65) Prior Publication Data

US 2009/0027873 A1 Jan. 29, 2009

Related U.S. Application Data

(60) Provisional application No. 60/948,398, filed on Jul. 6, 2007.

(51) Int. Cl.
*B64D 11/00* (2006.01)
(52) U.S. Cl. .......................... 362/34; 362/84
(58) Field of Classification Search .............. 362/34, 362/84
See application file for complete search history.

(56) References Cited

U.S. PATENT DOCUMENTS

| | | | |
|---|---|---|---|
| 5,711,594 A * | 1/1998 | Hay | 362/84 |
| 6,091,878 A | 7/2000 | Abranowicz et al. | |
| 6,425,676 B1 | 7/2002 | Lyons | |
| 6,874,919 B2 * | 4/2005 | Stokes et al. | 362/471 |
| 2005/0217611 A1 | 10/2005 | Morehead | |
| 2007/0039561 A1 | 2/2007 | Tarlton | |

OTHER PUBLICATIONS

PCT Search Report and Written Opinion for PCT/US2008/069324, Sep. 3, 2008, copy consists of 9 unnumbered pages.

* cited by examiner

*Primary Examiner*—Anabel M Ton (57) ABSTRACT

In one embodiment, the invention is an illumination source. In one embodiment, the illumination source comprises an outer sheath formed of a resilient, substantially transparent or translucent material, and a luminous core housed within the sheath. In further embodiments, the illumination source comprises a selvedge for facilitating mechanical attachment and/or a reflective strip to enhance visibility.

19 Claims, 10 Drawing Sheets

ILLUMINATION SOURCE

CROSS REFERENCE TO RELATED APPLICATIONS

This application claims the benefit of U.S. Provisional Patent Application Ser. No. 60/948,398, filed Jul. 6, 2007, which is herein incorporated by reference in its entirety.

FIELD OF THE INVENTION

The present invention relates generally to illumination sources and relates more specifically to rechargeable illumination sources.

BACKGROUND OF THE DISCLOSURE

Illumination sources are used in many applications, including home and businesses uses, toys, safety and emergency equipment, sports equipment and pet accessories. Such illumination sources are typically used to illuminate poorly lit areas and/or to aid in locating items in poorly lit conditions.

Conventional illumination sources, while they may provide adequate illumination, suffer from drawbacks such as relative mechanical inflexibility and an inability to efficiently recharge (including electrical recharge, i.e., with a power source). Thus, such illumination sources are not adequately protected against the mechanical shocks, stresses and strains and the patterns of use inherent in many applications.

Thus, there is a need for a mechanically robust, resilient, safe, and rechargeable illumination source.

SUMMARY OF THE INVENTION

In one embodiment, the invention is an illumination source. In one embodiment, the illumination source comprises an outer sheath formed of a resilient, substantially transparent or translucent material, and a luminous core housed within the sheath. In further embodiments, the illumination source comprises a selvedge and/or multiple protrusions for facilitating mechanical attachment and/or one or more reflective strips to enhance visibility.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is an illumination source, for example for use in home and businesses applications, toys, safety equipment, industrial safety and first responder emergency equipment (e.g., firefighter and police equipment, boating equipment, life vests, etc.), sports equipment, swimming pool equipment, deck edging, playground equipment, and pet accessories. The illumination source of the present invention is suitable for use in darkened conditions, where visibility may be diminished. The novel illumination source is also suitable for use in conditions where the illumination source may be subject to mechanical stresses and strains.

Figure 1A:
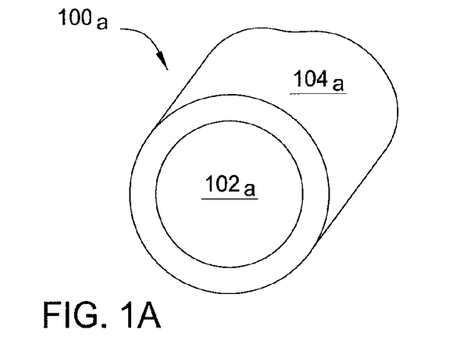
FIG. 1A illustrates a cross sectional view of one embodiment of an illumination source, according to the present invention.

FIG. 1A illustrates a cross sectional view of one embodiment of an illumination source 100a, according to the present invention. As illustrated, the illumination source 100a comprises a flexible but solid, photoluminescent/luminous (i.e., light absorbing and emitting) core 102a and a resilient sheath 104a surrounding the core 102a. The sheath 104a functions as a lens, while the core 102a functions as a filament. In one embodiment, materials for the sheath 104a and the core 102a are selected to create a molecular structure that results in a Rayleigh scattering effect (i.e., as light passes from the core 102a through the sheath 105a, the glow is magnified). Thus, illumination is emitted by diffusion through the sheath 104a, by process of the Rayleigh scattering. A further function of the clear or translucent sheath 104a is that it allows the luminous core 102a to be "recharged" by lensed ambient light.

In one embodiment, the core 102a is a luminous gel suspended within the sheath 104a. The core 102a emits illumination in a substantially continuous manner (e.g., by scattering of monochromatic light via the Tyndall Effect), and in substantially 360 degrees along substantially its entire length. In one embodiment, the core 102a is tinted, for instance with a fluorescent dye, in order to produce tinted illumination. For instance, Table 1 lists a plurality of core tint colors that have been demonstrated to produce certain approximated wavelengths and approximated persistence (light emission), where the persistence indicates capability of the core 102a to emit light on a single charge (i.e., without being recharged):

TABLE 1

| Core tints | | |
|---|---|---|
| Color | Wavelength (nm) | Persistence (hours) |
| Purple | 380-450 | 5-6 |
| Blue | 470-490 | 8-20 |
| Blue/Green | 505-520 | 8-20 |
| Yellow | 570-590 | 1-3 |
| Orange | 590-620 | 1 |
| Red | 620-750 | 0.5 |

In one embodiment, the gel of the core 102a comprises a substantially homogeneously distributed phosphor powder suspended within a viscous carrier (e.g., a water-clear, clear, translucent and/or opaque gel). In a further embodiment, the gel further comprises a silicone room temperature vulcanization (RTV) polymer mixed with silicone oil. The amount of phosphor present in the core 102a will dictate the brightness (e.g., per square meter). In one embodiment, the gel comprises one half a gram of phosphor powder and up to twenty-five grams of phosphor powder in carrier, per liquid ounce of silicone and/or silicone mixed with silicone oil (mixture). In another embodiment, the gel comprises approximately eighty-seven to ninety percent phosphor powder and approximately ten to thirteen percent carrier per liquid ounce.

In one embodiment, the viscous carrier comprises at least one of: a hydrogel (i.e., a water-absorbing acrylomide polymer), an oxime or acetoxy RTV silicone, a vulcanizable rubber (e.g., acrylic, butadiene, neoprene, silicone), a thermoplastic, a thermorubber, a heat liquefied material, hot glue, an ethylene vinyl acetate (EVA), a polyurethane (PU), a polyethylene (PE), a polyamide (PA), polyester, a high-temperature melt wax, a mineral, petroleum, microcrystalline, paraffin, polythene, latex, acrylic latex, synthetic rubber, polymerized isoprene/butadiene/chloroprene, butyl rubber/polyisobutylene (PIB)/vinyl polymer, styrene-butadienbe (SBR) poly methyl methacrylate, metallocene-based rubber, nitrile rubber, an acrylic emulsion, an ethylene emulsion, zinc cross-linked acrylic, an ultraviolet-curable polymer, an ultraviolet-curable rubber or high-viscosity silicone oil (e.g., dimethyl polysiloxane).

In one embodiment, the phosphor powder comprises at least one of: a magnesium strontium silicate, a strontium aluminate, a silic acid magnesium salt (e.g., dysprosium europium doped), a zinc sulfate, a zinc sulfate copper, an aluminate or copper. In another embodiment, the phosphor powder comprises litrosphere additives, such as radioluminescent paint isotopes (e.g., tritium or promethium-147) or nano-phosphors.

In one embodiment, the silicone oil comprises at least one of: dimethyl polysiloxane, a hydrophobic liquid (e.g., petrolatum, mineral oil, petrochemical oil or a volatile essential oil).

In further embodiments, the gel of the core 102a includes an optional styrenic masking scent (e.g., inorganic/synthetic or aromatic compounds from plants).

In one embodiment, the gel of the core 102a comprises a self-curing polymer that bonds to the interior surface of the sheath 104a, such that the gel will not leak out of the sheath 104a.

The sheath 104a substantially surrounds the core 102a and comprises a resilient, non-toxic material adapted to absorb mechanical shocks, stresses and strains. In one embodiment, the sheath 104a comprises a tube formed from a substantially transparent to opaque elastomeric or polymer material such as a fluoroelastomer or a fluoropolymer. In one embodiment, the sheath 104a is clear to translucent in substantially 360 degrees, so that the sheath 104a may function as a light collecting lens and may emit light along substantially its entire length. In another embodiment, the sheath 104a is tinted, for example using a fluorescent dye. In further embodiments, the material forming the sheath 104a is a flexible or rigid, scuff-resistant polymer. Increased flexibility may be desirable, for instance, for athletic applications. For example, in one embodiment, the sheath 104a comprises at least one of: urethane, polyurethane (PU), silicone, thermoplastic resin (TPR), nylon, fluorinated ethylene propylene (FEP), perfluoroalkoxy polymer resin (PFA), polyethylene (PE), polyethylene terephthalate (PET), polytetrafluoroethylene (PTFE), polyvinyl chloride (PVC), flexible polyvinyl chloride (FPVC), ultraviolet-stabilized polyvinyl chloride (UV stabilized PVC), low-density polyethylene (LDPE), polyactic acid (PLA), polypropylene (PP), polyamide (PA), polycarbonate (PC), polystyrene (PS), acrylonitrile butadiene styrene (ABS), polymethyl methacrylate (PMMA), polyvinylidine chloride (PVDC), polyvinylidine fluoride (PVDF), ethyl vinyl acetate (EVA), polyester, polyvinyl acetate (PVA), polyoxymethylene (POM), or latex, among other materials.

In an alternative embodiment, the sheath 104a is formed from one or more unsaturated rubbers that can be cured by sulfur vulcanization, such as: natural rubber (NR), polyisoprene (IR), butyl rubber (IRR, copolymer of isobuylene and isoprene), halogenated butyl rubber (e.g., chloro butyl rubber (CIIR) or bromo butyl rubber (BIIR)), polybutadiene (BR), styrene-butadiene rubber (SBR, copolymer of polystyrene and polybutadiene)nitrile rubber (NBR, copolymer of polybutadiene and acrylonitrile), hydrated nitrile rubber (HNBR), chloroprene rubber (CR), polychloroprene, or neoprene. In further embodiments, the sheath 104a is formed from one or more unsaturated rubbers that cannot be cured by sulfur vulcanization, such as: ethylene propylene rubber (EPM, a copolymer faeces of polyethylene and polypropylene), ethylene propylene diene rubber (EPDM, a terpolymer of polyethylene, polypropylene, and a diene-component), epichlorohydrin rubber (ECO), polyacrylic rubber (ACM, ABR), silicone rubber (SI, Q, VMQ), fluorosilicone rubber (FVMQ), fluoroelastomers (FKM, FPM), perfluoroelastomers (FFKM), polyether block amides (PEBA), tetrafluoro ethylene/propylene rubber (FEPM), cholorsulfonated polyethylene (CSM), or ethylene-vinyl acetate (EVA).

In another embodiment, the sheath 104a is formed of one or more other types of elastomers, such as: thermoplastic elastomers (TPE), thermoplastic vulcanizates (TPV), polyurethane rubber, resilin, elastin, or polysulfide rubber.

In yet another embodiment, the sheath 104a is at least partly formed of one or more bioplastics (i.e., derived from renewable biomass sources, such as vegetable oil, corn starch, pea starch or microbiota, rather than derived from petroleum like traditional plastics).

In a further embodiment still, the material(s) comprising the sheath 104a includes one or more flame retardant additives that improve the fire resistance of the illumination source 100a. This embodiment is especially useful in situations where the illumination source 100a is deployed in conjunction with high-heat applications such as building (fire life) safety and code-approved applications (e.g., such as those tested by safety testing and real estate organizations including Underwriters Laboratories (UL); ULCanada, Building Owners Managers Association (BOMA) International, National Fire Protection Association (NFPA), and the like. In one embodiment, the sheath material is selected to meet at least one of the UL 94-HB, UL 94-VO, and UL 94-V5 standards.

In further embodiments, additional polymer customization is created for greater stability according to the field of use (e.g., plasticizers to resist cracking in extreme temperatures). In another embodiment, the sheath 104a comprises a phosphor-impregnated polymer tubing and/or internally coated tubing (e.g., similar to an optical fiber). In such an embodiment, the illumination source 100a can be fabricated as a stand-alone or unitary structure (i.e., a separate core 102a and sheath 104a are not required). In other embodiments, the sheath 104a may be formed from any material that provides adequate resiliency to protect the core 102a, and that is transparent enough to allow substantially 360 degree radiant light dispersion (from the core 102a) therethrough.

In one embodiment, the cross-sectional shape of the sheath 104a may take any form. Although the cross-section of the sheath 104a that is illustrated in FIG. 1A is substantially circular in shape, in other embodiments (described in greater detail below), the cross sectional may take the shape of at least one of: a square, a rectangle, an ovoid, a semicircle, a compound curve (e.g., convex or concave), a flat panel, a triangle, or a custom shape. Such cross sections may be symmetric or asymmetric. The sheath 104a achieves greater apparent diameter by surround the core 102a, due to refraction of light though the thickness of the sheath 104a (i.e., through the sheath walls).

The luminous, resilient illumination source 100a of the present invention is thus both sufficiently luminous to provide visibility and mechanically robust to substantially prevent failure. The use of a luminous gel as the core 102a of the illumination source 100a enables the core 102a to be at least as resilient as the sheath 104a surrounding the core 102a, so that the failure rate associated with mechanical light-emitting mechanisms is substantially reduced. Moreover, in embodiments where phosphor powder is used to provide luminescence in the core 102a, the illumination source 100a may be re-energized so that the illumination source 100a can be used over time with little observable diminishment of the illumination sources's radiant properties (e.g., utilizing the Tyndall effect).

As discussed above, the concept of luminous gel housed within a resilient sheath may be deployed for use in connection with a variety of applications. For example, the inventive illumination source may be used to provide illumination and/or visibility for sports equipment and accessories (e.g., athletic footwear, running equipment, hiking equipment, mountaineering equipment, diving equipment, snorkeling fins, bicycle spokes, bicycles frames, coolers, trail markers, fishing rod tips, fishing lures, tackle gear, commercial fishing nets, on-deck gear, long line lights for hooks, sleeping bags, tent door entrances, tent perimeter, tent flooring, tent line stays, backpacks, gloves, medical kits, rescue crosses and clothing such as jackets, pants and wetsuits), architectural edging (e.g., pathways, decks, porches, hand rails, deck rails, stair treads, garden edging, marinas, docks, gangways, lighted edging, boat edging, stair edging and cove edging, for example for hallways, basements and garages), toys (e.g., jump ropes, uniforms, beds, closets, hallway edging, bathroom edging and novelty items), safety, first responder, and emergency equipment and apparel (e.g., egress lighting, dock lighting, swimming pool edging, footwear, headwear, night walking/running apparel, vests, and personal flotation devices), pet accessories (e.g., leashes/leads, collars, jackets, booties), automotive interiors (e.g., outlines for door trim, cup holders, handles, glove boxes, or seats), utility applications (e.g., oil platforms, mines, public utilities, processing facilities), and traffic or transportation applications (e.g., overhead panel light for bus stops, location signs). The particular application of the illumination source may dictate characteristics such as materials, sizing, cross section, and mechanical attachments (various embodiments of which are further discussed below).

Moreover, embodiments of the present illumination source 100a have been demonstrated to operate successfully in a variety of environments, from ambient air to water depths of approximately 1,500 feet and more and in temperatures ranging from approximately −100 degrees Fahrenheit to 450 degrees Fahrenheit. Capability of the illumination source 100a to withstand certain environmental conditions will depend at least partly on material selection for the core 102a and the sheath 104a.

Figure 1B:
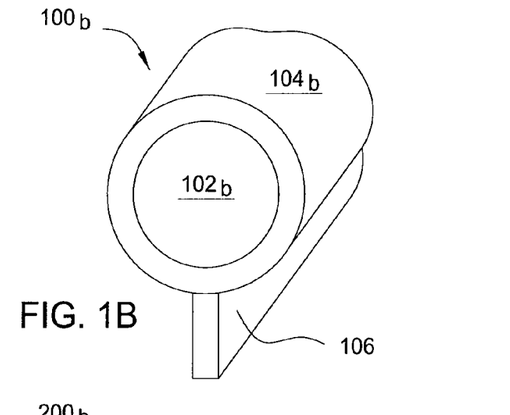
FIG. 1B illustrates a cross sectional view of a variation of the illumination source of FIG. 1A.

FIG. 1B illustrates a cross sectional view of a variation of the illumination source 100a of FIG. 1A. In particular, FIG. 1B illustrates an illumination source 100b comprising a sheath 104b containing a luminous core 102b, and further comprising at least one selvedge or flange 106 coupled to the sheath 104b. The selvedge 106 facilitates mechanical attachment of the light source to an article to be illuminated. For example, the selvedge 106 may allow the illumination source 100b to be permanently (e.g., by stitching, adhesive, nail, brad, staple, molding or other means) or detachably (e.g., by U-clamp, cable clamp, tie, loop, guide, ring, hoop-and-loop fastener or other means) affixed to a surface such as an article of clothing or sports equipment. In one embodiment, the selvedge 106 is formed of any of the same materials from which the sheath 104b may be formed. In one embodiment, the selvedge 106 has an edge that is at least one of: flat, barbed or arrowed (or other custom geometry), depending on the nature in which the selvedge is to be used to attach, fasten, position, or reposition the illumination source 100 to a (flexible or fixed) surface.

In one embodiment, a selvedge such as the selvedge 106 may be coupled to a sheath of any cross section (e.g., a circle, a square, a rectangle, an ovoid, a semicircle, a compound curve or a triangle), as illustrated in greater detail with respect to FIGS. 2A-6B. Moreover, an illumination source may comprise any number of selvedges, as illustrated in further detail with respect to FIGS. 7-10.

Figure 2A:
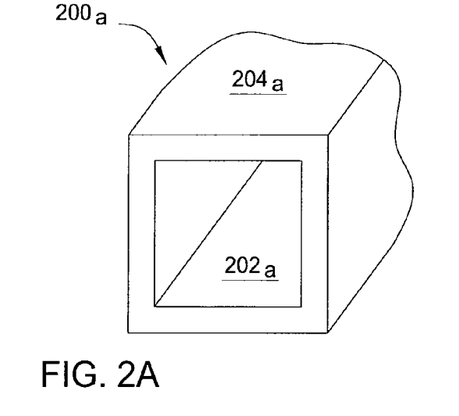
FIG. 2A illustrates a cross sectional view of another embodiment of an illumination source, according to the present invention.
Figure 2B:
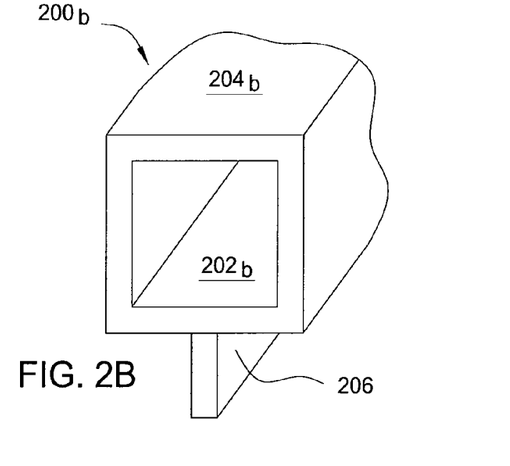
FIG. 2B illustrates a cross sectional view of a variation of the illumination source of FIG. 2A.

FIG. 2A illustrates a cross sectional view of another embodiment of an illumination source 200a, according to the present invention. Specifically, the illumination source 200a comprises a luminous core 202a surrounded by a sheath 204a having a substantially square shaped cross section. FIG. 2B illustrates a cross sectional view of a variation of the illumination source 200a of FIG. 2A. In particular, FIG. 2B illustrates an illumination source 200b comprising a sheath 204b having a substantially square shaped cross section and containing a luminous core 202b, and further comprising a selvedge or flange 206 coupled to the sheath 204b.

Figure 3A:
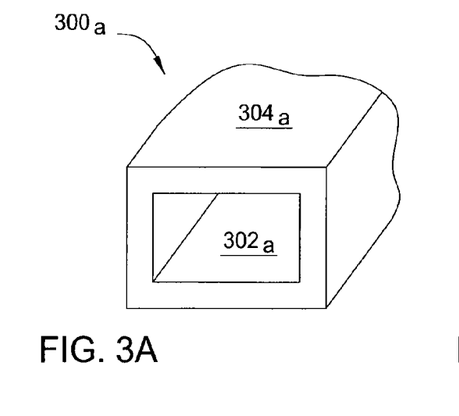
FIG. 3A illustrates a cross sectional view of another embodiment of an illumination source, according to the present invention.
Figure 3B:
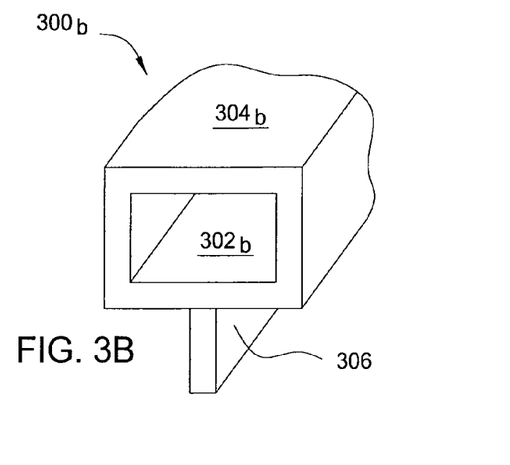
FIG. 3B illustrates a cross sectional view of a variation of the illumination source of FIG. 3A.

FIG. 3A illustrates a cross sectional view of another embodiment of an illumination source 300a, according to the present invention. Specifically, the illumination source 300a comprises a luminous core 302a surrounded by a sheath 304a having a substantially rectangular shaped cross section. FIG. 3B illustrates a cross sectional view of a variation of the illumination source 300a of FIG. 3A. In particular, FIG. 3B illustrates an illumination source 300b comprising a sheath 304b having a substantially rectangular shaped cross section and containing a luminous core 302b, and further comprising a selvedge or flange 306 coupled to the sheath 304b.

Figure 4A:
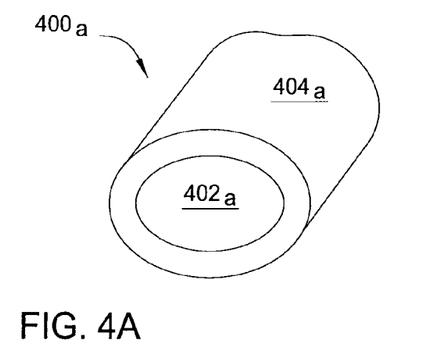
FIG. 4A illustrates a cross sectional view of another embodiment of an illumination source, according to the present invention.
Figure 4B:
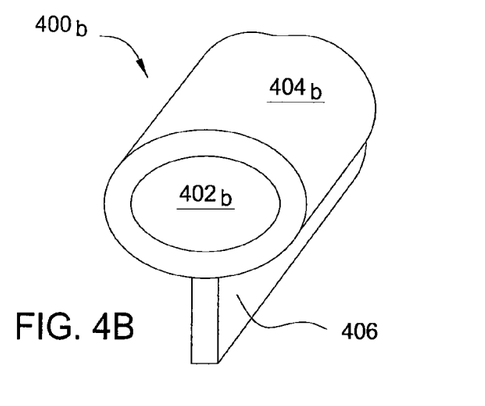
FIG. 4B illustrates a cross sectional view of a variation of the illumination source of FIG. 4A.

FIG. 4A illustrates a cross sectional view of another embodiment of an illumination source 400a, according to the present invention. Specifically, the illumination source 400a comprises a luminous core 402a surrounded by a sheath 404a having a substantially ovoid shaped cross section. FIG. 4B illustrates a cross sectional view of a variation of the illumination source 400a of FIG. 4A. In particular, FIG. 4B illustrates an illumination source 400b comprising a sheath 404b having a substantially ovoid shaped cross section and containing a luminous core 402b, and further comprising a selvedge or flange 406 coupled to the sheath 404b.

Figure 5A:
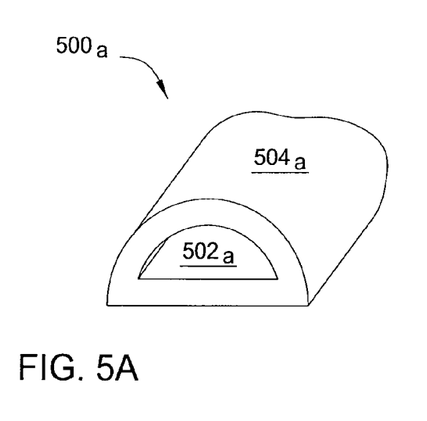
FIG. 5A illustrates a cross sectional view of another embodiment of an illumination source, according to the present invention.
Figure 5B:
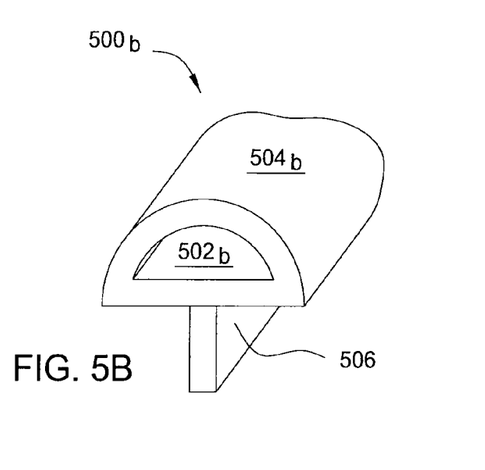
FIG. 5B illustrates a cross sectional view of a variation of the illumination source of FIG. 5A.

FIG. 5A illustrates a cross sectional view of another embodiment of an illumination source 500a, according to the present invention. Specifically, the illumination source 500a comprises a luminous core 502a surrounded by a sheath 504a having a substantially semicircular shaped cross section. FIG. 5B illustrates a cross sectional view of a variation of the illumination source 500a of FIG. 5A. In particular, FIG. 5B illustrates an illumination source 500b comprising a sheath 504b having a substantially semicircular shaped cross section and containing a luminous core 502b, and further comprising a selvedge or flange 506 coupled to the sheath 504b.

Figure 6A:
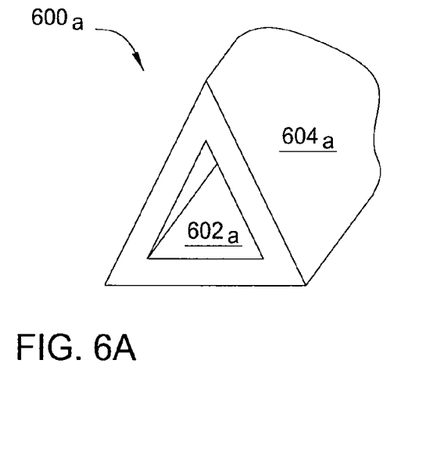
FIG. 6A illustrates a cross sectional view of another embodiment of an illumination source, according to the present invention.
Figure 6B:
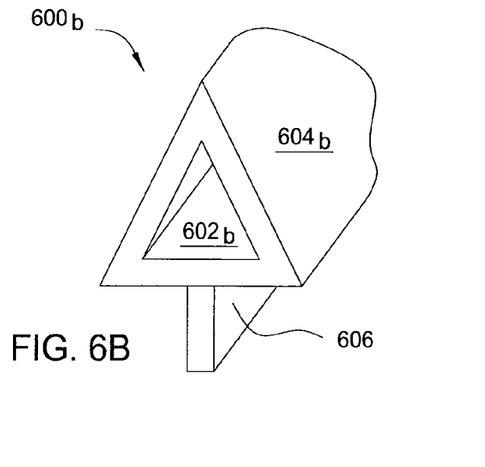
FIG. 6B illustrates a cross sectional view of a variation of the illumination source of FIG. 6A.

FIG. 6A illustrates a cross sectional view of another embodiment of an illumination source 600a, according to the present invention. Specifically, the illumination source 600a comprises a luminous core 602a surrounded by a sheath 604a having a substantially triangular shaped cross section. FIG. 6B illustrates a cross sectional view of a variation of the illumination source 600a of FIG. 6A. In particular, FIG. 6B illustrates an illumination source 600b comprising a sheath 604b having a substantially triangular shaped cross section and containing a luminous core 602b, and further comprising a selvedge or flange 606 coupled to the sheath 604b.

Figure 7:
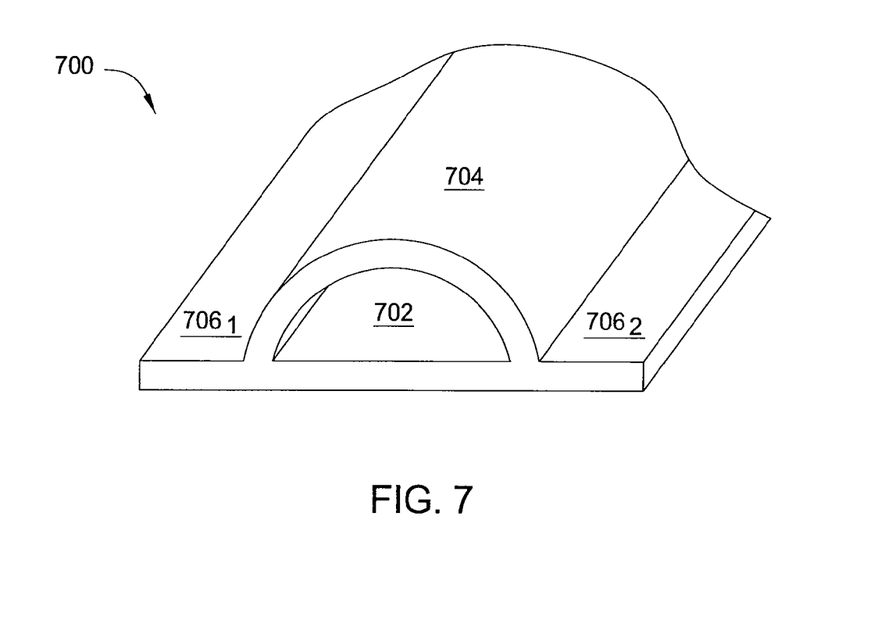
FIG. 7 illustrates a cross sectional view of another embodiment of an illumination source, according to the present invention.
Figure 9:
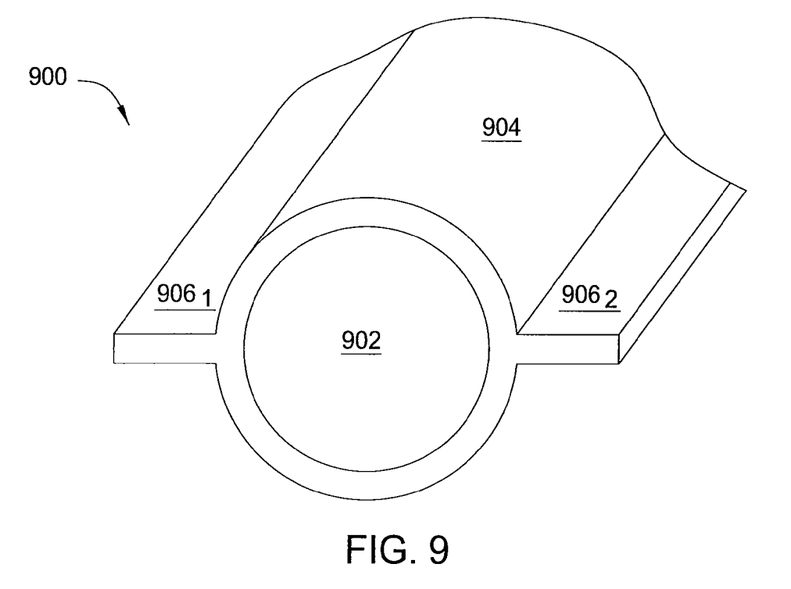
FIG. 9 illustrates a cross sectional view of another embodiment of an illumination source, according to the present invention.

FIG. 7 illustrates a cross sectional view of another embodiment of an illumination source 700, according to the present invention. As illustrated, the illumination source 700 comprises a luminous core 702 and a resilient sheath 704 surrounding the core 702. In addition, the illumination source 700 comprises two selvedges $706_1$-$706_2$ (hereinafter collectively referred to as "selvedges 706"). Although the sheath 704 is illustrated as having a semicircular cross section, it will be appreciated that the use of the two selvedges 706 is not limited by the shape of the sheath's cross section (i.e., two selvedges 706 may be coupled to a sheath having a cross section of any shape, including those shapes mentioned previously herein). FIG. 9, for instance, illustrates a cross sectional view of another embodiment of an illumination source 900, according to the present invention. As illustrated, the illumination source 900 comprises a luminous core 902 and a resilient sheath 904 surrounding the core 902, the sheath 902 having a circular cross section. In addition, the illumination source 900 comprises two selvedges $906_1$-$906_2$ (hereinafter collectively referred to as "selvedges 906").

Figure 8:
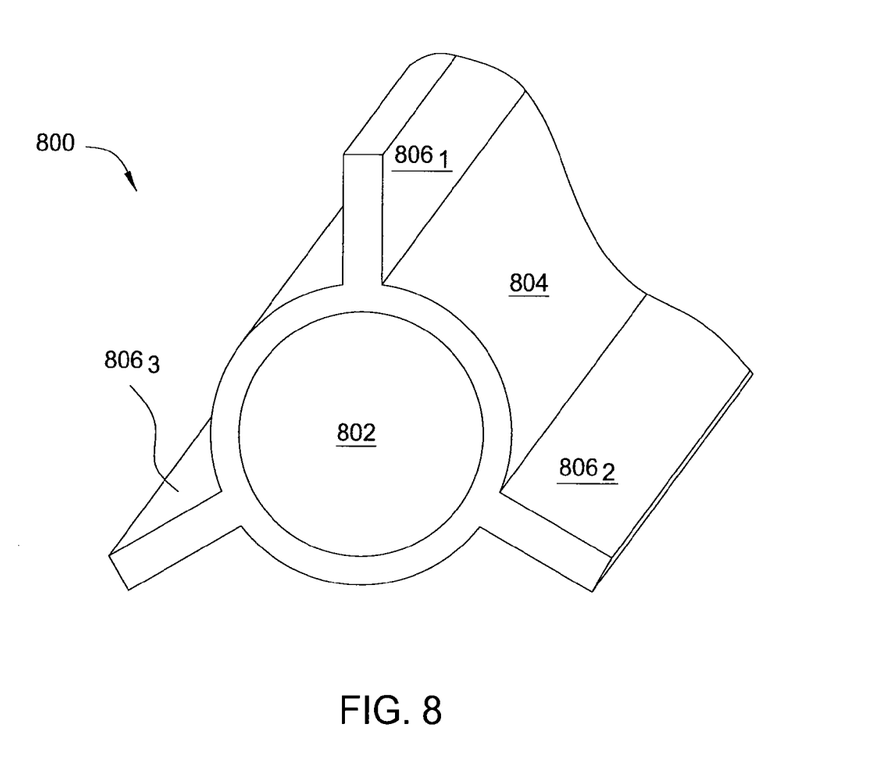
FIG. 8 illustrates a cross sectional view of another embodiment of an illumination source, according to the present invention.

FIG. 8 illustrates a cross sectional view of another embodiment of an illumination source 800, according to the present invention. As illustrated, the illumination source 800 comprises a luminous core 802 and a resilient sheath 804 surrounding the core 802. In addition, the illumination source 800 comprises three selvedges $806_1$-$806_3$ (hereinafter collectively referred to as "selvedges 806"). Although the sheath 804 is illustrated as having a circular cross section, it will be appreciated that the use of the three selvedges 806 is not limited by the shape of the sheath's cross section (i.e., three selvedges 806 may be coupled to a sheath having a cross section of any shape, including those shapes mentioned previously herein).

Figure 10:
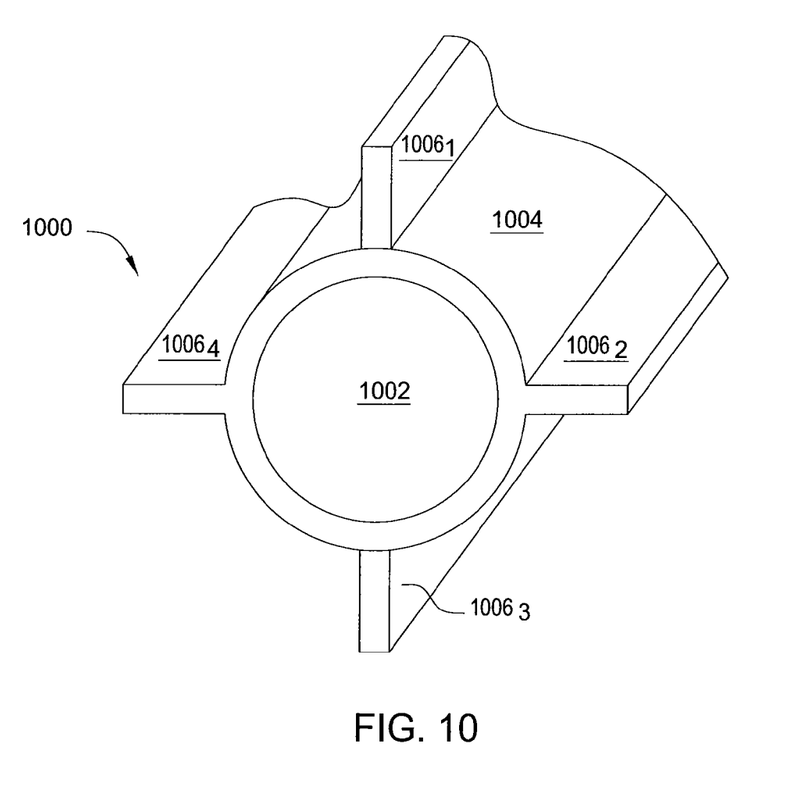
FIG. 10 illustrates a cross sectional view of another embodiment of an illumination source, according to the present invention.

FIG. 10 illustrates a cross sectional view of another embodiment of an illumination source 1000, according to the present invention. As illustrated, the illumination source 1000 comprises a luminous core 1002 and a resilient sheath 1004 surrounding the core 1002. In addition, the illumination source 1000 comprises four selvedges $1006_1$-$1006_4$ (hereinafter collectively referred to as "selvedges 1006"). Although the sheath 1004 is illustrated as having a circular cross section, it will be appreciated that the use of the four selvedges 1006 is not limited by the shape of the sheath's cross section (i.e., four selvedges 1006 may be coupled to a sheath having a cross section of any shape, including those shapes mentioned previously herein).

Figure 11:
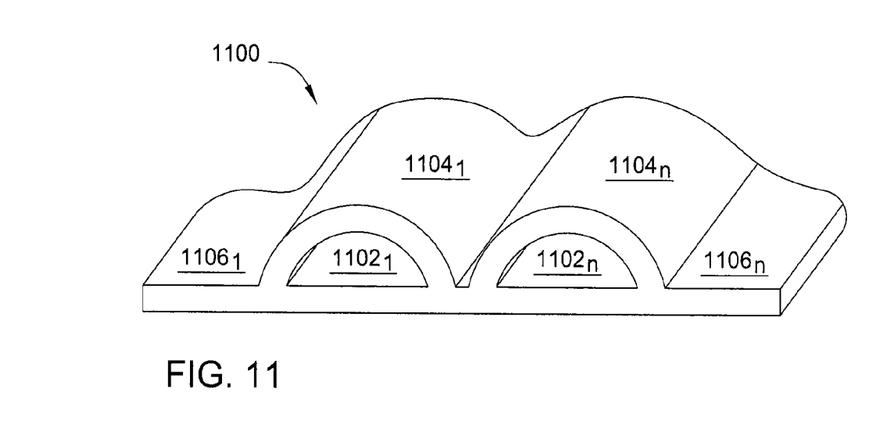
FIG. 11 illustrates a cross sectional view of another embodiment of an illumination source, according to the present invention.

FIG. 11 illustrates a cross sectional view of another embodiment of an illumination source 1100, according to the present invention. As illustrated, the illumination source 1100 comprises a compound sheath comprising at least two individual sheaths $1104_1$-$1104_n$ (hereinafter collectively referred to as "sheaths 1104"). The sheaths 1104 are coupled to each other, and each sheath 1104 defines a separate interior volume within which a luminous core $1102_1$-$1102_n$ (hereinafter collectively referred to as "cores 1102") is housed. In addition, the illumination source 1100 comprises at least one selvedge $1106_1$-$1106_n$ (hereinafter collectively referred to as "selvedges 1106"). In the illustrated embodiment, the selvedges 1106 are laterally coupled to the sheaths 1104, one selvedge 1106 to each sheath 1104. Although the sheaths 1104 are illustrated as having semicircular cross sections, it will be appreciated that the use of compound sheaths 1104 is not limited by the shape of the sheaths' cross sections (i.e., compound sheaths 1104 may have a cross section of any shape, including those shapes mentioned previously herein). Furthermore, although the sheaths 1104 are illustrated as having substantially the same cross sectional shape (i.e., both semicircular), it will be appreciated that when using compound sheaths, the sheaths do not necessarily need to have the same cross sectional shape, and may, in fact, have different cross sectional shapes (e.g., one semicircle, one triangle and/or multiple repeated or dissimilar geometries). In some embodiments, a compound sheath may be formed as a series of sheaths having tangentially connected circular cross sections or connected rectangular cross sections that share walls. Such configurations have been shown to produce a flat light with a large surface area, resulting in improved brightness.

Figure 12:
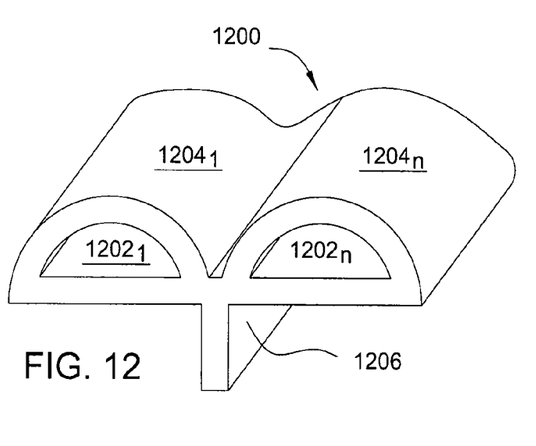
FIG. 12 illustrates a cross sectional view of another embodiment of an illumination source, according to the present invention.

FIG. 12 illustrates a cross sectional view of another embodiment of an illumination source 1200, according to the present invention. As illustrated, the illumination source 1200 comprises a compound sheath comprising at least two individual sheaths $1204_1$-$1204_n$ (hereinafter collectively referred to as "sheaths 1204"). The sheaths 1204 are coupled to each other, and each sheath 1204 defines a separate interior volume within which a luminous core $1202_1$-$1202_n$ (hereinafter collectively referred to as "cores 1202") is housed. In addition, the illumination source 1200 comprises at least one selvedge 1206. In the illustrated embodiment, one selvedge is coupled vertically between the sheaths 1204. Although the sheaths 1204 are illustrated as having semicircular cross sections, it will be appreciated that the use of compound sheaths 1204 is not limited by the shape of the sheaths' cross sections (i.e., compound sheaths 1204 may have a cross section of any shape, including those shapes mentioned previously herein).

Figure 13:
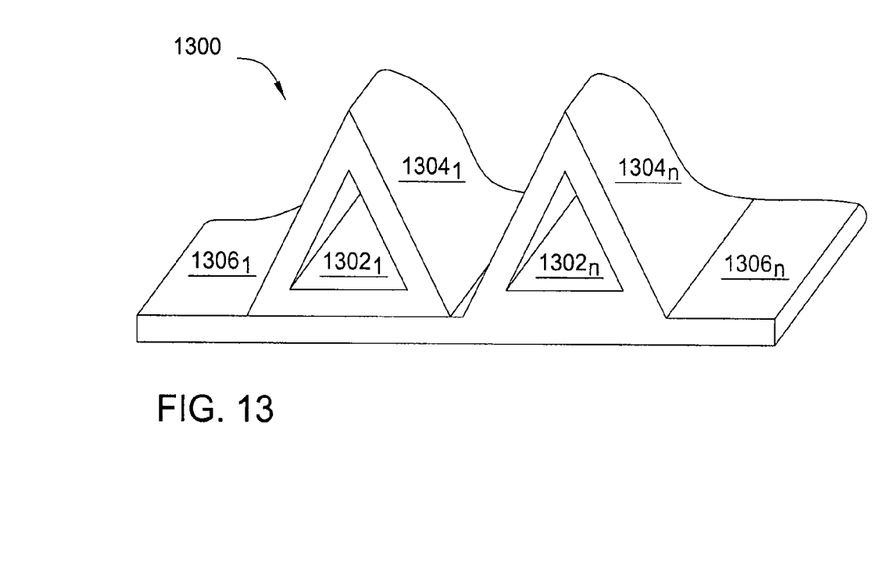
FIG. 13 illustrates a cross sectional view of another embodiment of an illumination source, according to the present invention.

FIG. 13 illustrates a cross sectional view of another embodiment of an illumination source 1300, according to the present invention. Like the illumination source 1100 illustrated in FIG. 11, the illumination source 1300 comprises a compound sheath comprising at least two individual sheaths $1304_1$-$1304_n$ (hereinafter collectively referred to as "sheaths 1304"). The sheaths 1304 are coupled to each other, and each sheath 1304 defines a separate interior volume within which a luminous core $1302_1$-$1302_n$ (hereinafter collectively referred to as "cores 1302") is housed. In addition, the illumination source 1300 comprises at least one selvedge $1306_1$-$1306_n$ (hereinafter collectively referred to as "selvedges 1306"). In the illustrated embodiment, the selvedges 1306 are laterally coupled to the sheaths 1304, one selvedge 1306 to each sheath 1304. Although the sheaths 1304 are illustrated as having triangular cross sections, it will be appreciated that the use of compound sheaths 1304 is not limited by the shape of the sheaths' cross sections (i.e., compound sheaths 1304 may have a cross section of any shape, including those shapes mentioned previously herein).

Figure 14:
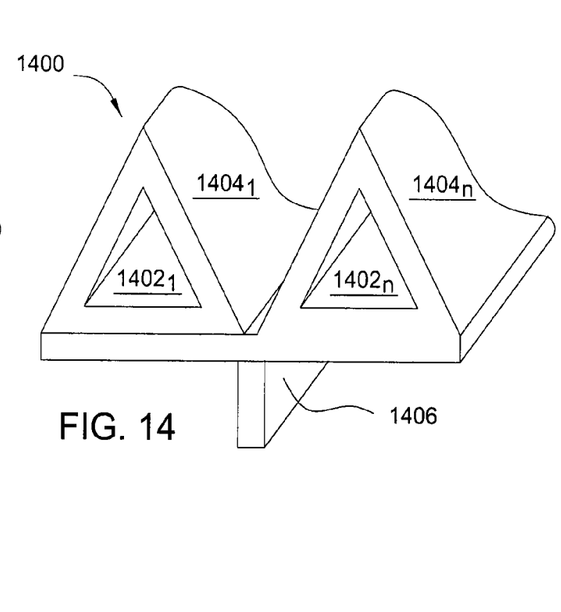
FIG. 14 illustrates a cross sectional view of another embodiment of an illumination source, according to the present invention.

FIG. 14 illustrates a cross sectional view of another embodiment of an illumination source 1400, according to the present invention. Like the illumination source 1200 illustrated in FIG. 12, the illumination source 1400 comprises a compound sheath comprising at least two individual sheaths $1404_1$-$1404_n$ (hereinafter collectively referred to as "sheaths 1404"). The sheaths 1404 are coupled to each other, and each sheath 1404 defines a separate interior volume within which a luminous core $1402_1$-$1402_n$ (hereinafter collectively referred to as "cores 1402") is housed. In addition, the illumination source 1400 comprises at least one selvedge 1406. In the illustrated embodiment, one selvedge is coupled vertically between the sheaths 1404. Although the sheaths 1404 are illustrated as having triangular cross sections, it will be appreciated that the use of compound sheaths 1404 is not limited by the shape of the sheaths' cross sections (i.e., compound sheaths 1404 may have a cross section of any shape, including those shapes mentioned previously herein).

In further embodiments, an illumination source according to any of the embodiments of the present invention comprises at least one reflective surface. Unlike the luminous core, which emits radiant photons to provide illumination, the reflective surface(s) reflects illumination emitted by a light source (e.g., the coupled illumination source or an external light source).

Figure 15A:
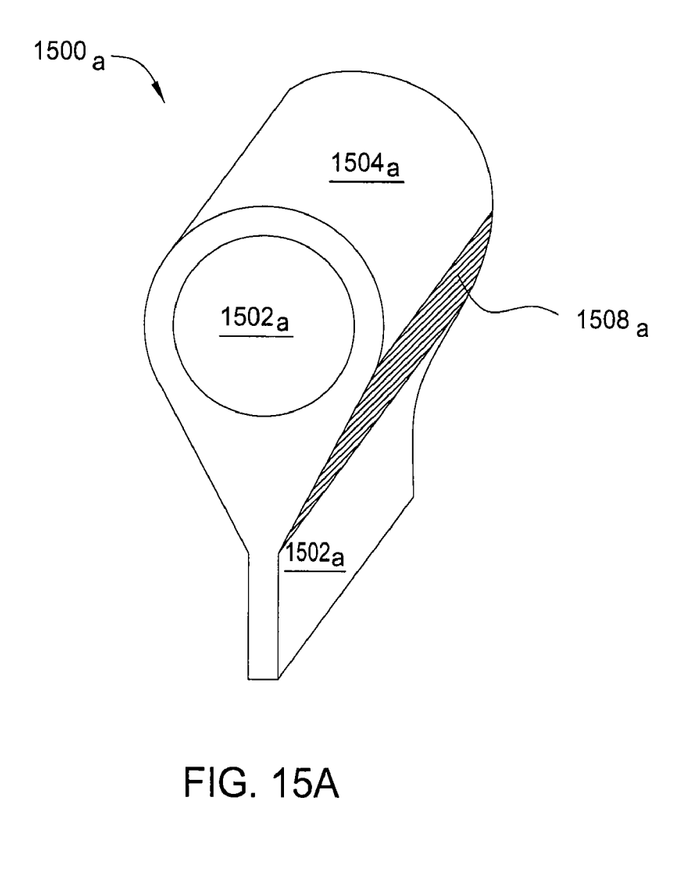
FIG. 15A illustrates a cross sectional view of another embodiment of an illumination source, according to the present invention.

For example, FIG. 15A illustrates a cross sectional view of another embodiment of an illumination source 1500a, according to the present invention. As illustrated, the illumination source 1500 comprises a luminous core 1502a housed within a sheath 1504a. The sheath 1504a is further coupled to at least one selvedge 1506a. In addition, a reflective strip 1508a is disposed between the sheath 1504a and the selvedge 1506a and runs along at least part of the length of the sheath 1504a. Although the sheath 1504a is illustrated as having a circular cross section, it will be appreciated that the use of a reflective strip 1508a is not limited by the shape of the sheath's cross section.

Figure 15B:
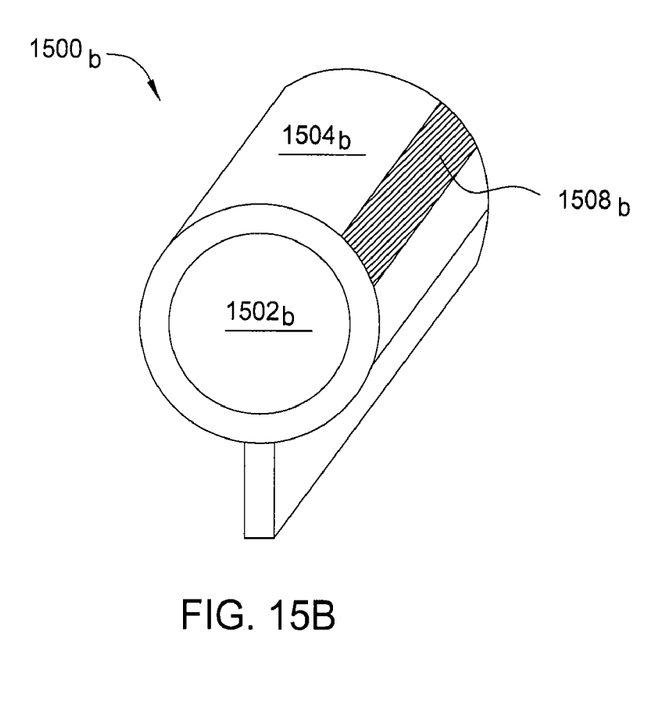
FIG. 15B illustrates a cross sectional view of a variation of the illumination source of FIG. 15A.

For example, FIG. 15B illustrates a cross sectional view of a variation of the illumination source 1500a of FIG. 15A. In particular, FIG. 15B illustrates an illumination source 1500b comprising a sheath 1504b containing a luminous core 1502b, and further comprising a selvedge 1506b coupled to the sheath 1504b. In this case, however, a reflective strip 1508b is disposed along at least part of the length of the surface of the sheath 1504b.

Figure 16A:
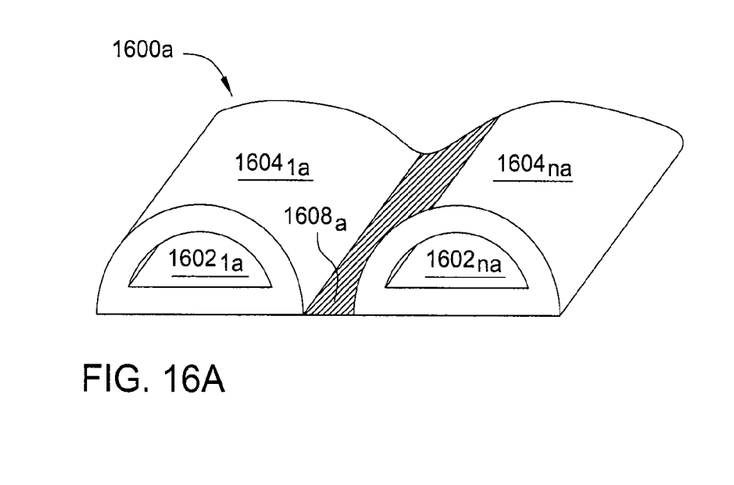
FIG. 16A illustrates a cross sectional view of another embodiment of an illumination source, according to the present invention.

FIG. 16A illustrates a cross sectional view of another embodiment of an illumination source 1600a, according to the present invention. As illustrated, the illumination source 1600a comprises a compound sheath comprising at least two sheaths $1604_1a$-$1604_na$ (hereinafter collectively referred to as "sheaths 1604a"), each sheath 1604a housing a luminous core $1602_1a$-$1602_na$ (hereinafter collectively referred to as "cores 1602a"). In addition, a reflective strip 1608a is disposed between the sheaths 1604a and runs along at least part of the lengths of the sheath 1604a. Although the sheaths 1604a are illustrated as having semicircular cross sections, it will be appreciated that the use of a reflective strip 1608a is not limited by the shape of the sheaths' cross sections.

Figure 16B:
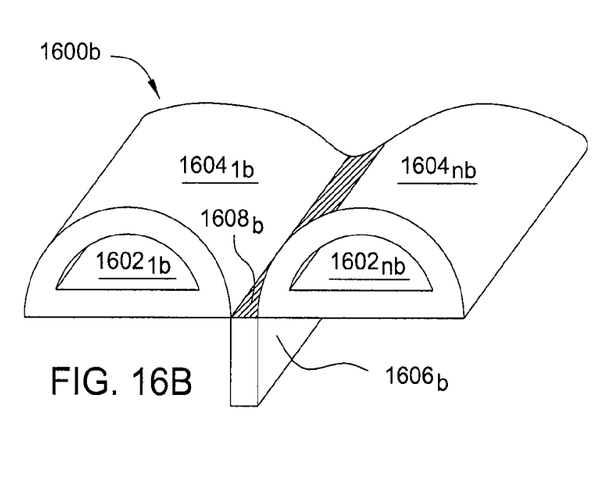
FIG. 16B illustrates a cross sectional view of a variation of the illumination source of FIG. 16A.

FIG. 16B illustrates a cross sectional view of a variation of the illumination source 1600a of FIG. 16A. In particular, FIG. 16B illustrates an illumination source 1600b comprising a compound sheath comprising at least two sheaths $1604_1b$-$1604_nb$ (hereinafter collectively referred to as "sheaths 1604b"), each sheath 1604b housing a luminous core $1602_1b$-$1602_nb$ (hereinafter collectively referred to as "cores 1602b"). In addition, a reflective strip 1608b is disposed between the sheaths 1604b and runs along at least part of the lengths of the sheaths 1604b. The illumination source 1600b further comprises at least one selvedge 1606b coupled to the sheaths 1604b. In the illustrated embodiment, a single vertical selvedge 1606b is coupled to the reflective strip 1608b, between the sheaths 1604b. Although the sheaths 1604b are illustrated as having semicircular cross sections, it will be appreciated that the use of a reflective strip 1608b is not limited by the shape of the sheaths' cross sections.

Figure 16C:
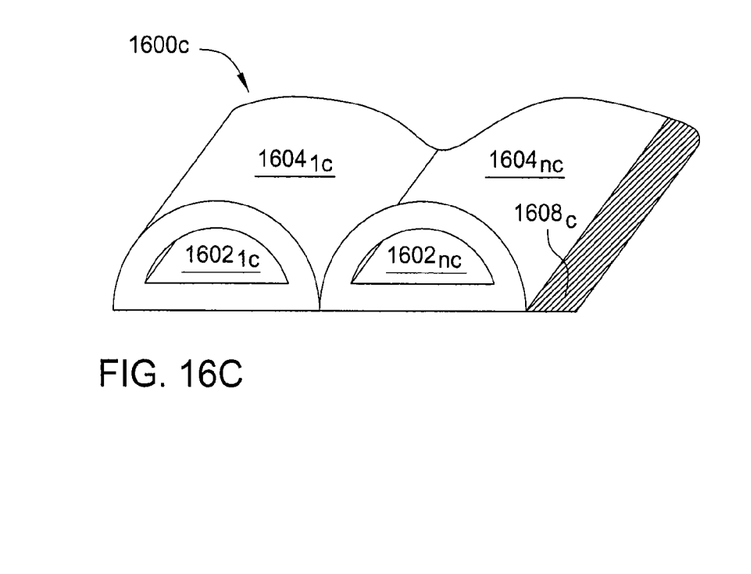
FIG. 16C illustrates a cross sectional view of another embodiment of an illumination source, according to the present invention.

FIG. 16C illustrates a cross sectional view of another embodiment of an illumination source 1600c, according to the present invention. As illustrated, the illumination source 1600c comprises a compound sheath comprising at least two sheaths $1604_1c$-$1604_nc$ (hereinafter collectively referred to as "sheaths 1604c"), each sheath 1604c housing a luminous core $1602_1c$-$1602_nc$ (hereinafter collectively referred to as "cores 1602c"). In addition, a reflective strip 1608c is disposed laterally relative to one of the sheaths 1604c and runs along at least part of the lengths of the sheath 1604c. Although the sheaths 1604c are illustrated as having semicircular cross sections, it will be appreciated that the use of a reflective strip 1608c is not limited by the shape of the sheaths' cross sections.

Figure 16D:
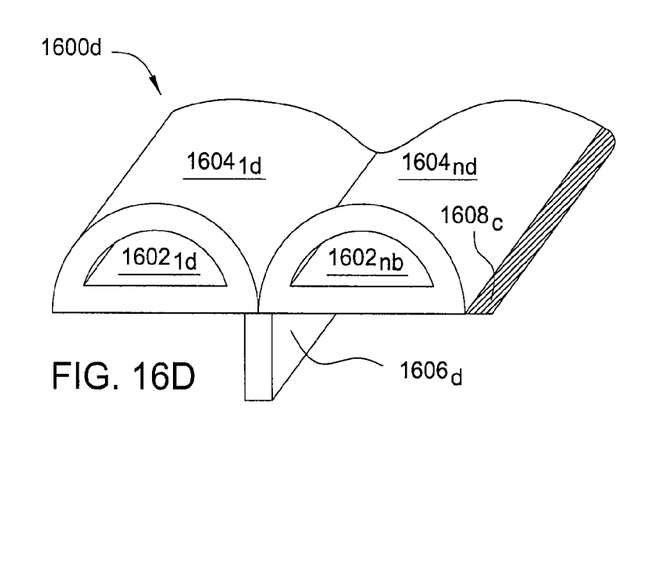
FIG. 16D illustrates a cross sectional view of a variation of the illumination source of FIG. 16C.

FIG. 16D illustrates a cross sectional view of a variation of the illumination source 1600c of FIG. 16C. In particular, FIG. 16D illustrates an illumination source 1600d comprising a compound sheath comprising at least two sheaths $1604_1d$-$1604_nd$ (hereinafter collectively referred to as "sheaths 1604d"), each sheath 1604d housing a luminous core $1602_1d$-$1602_nd$ (hereinafter collectively referred to as "cores 1602d"). In addition, a reflective strip 1608d is disposed laterally relative to one of the sheaths 1604d and runs along at least part of the lengths of the sheaths 1604d. The illumination source 1600d further comprises at least one selvedge 1606d coupled to the sheaths 1604d. In the illustrated embodiment, a single vertical selvedge 1606d is coupled between the sheaths 1604d. Although the sheaths 1604d are illustrated as having semicircular cross sections, it will be appreciated that the use of a reflective strip 1608d is not limited by the shape of the sheaths' cross sections.

Figure 16E:
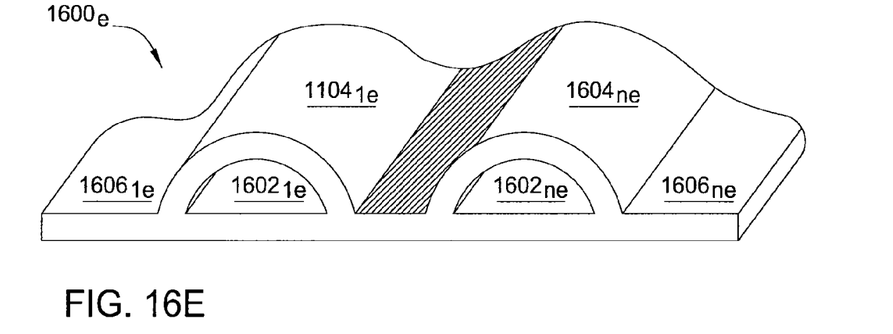
FIG. 16E illustrates a cross sectional view of a variation of the illumination source of FIG. 16A.

FIG. 16E illustrates a cross sectional view of a variation of the illumination source 1600a of FIG. 16A. In particular, FIG. 16E illustrates an illumination source 1600e comprising a compound sheath comprising at least two sheaths $1604_1e$-$1604_ne$ (hereinafter collectively referred to as "sheaths 1604e"), each sheath 1604e housing a luminous core $1602_1e$-$1602_ne$ (hereinafter collectively referred to as "cores 1602e"). In addition, a reflective strip 1608e is disposed between the sheaths 1604e and runs along at least part of the lengths of the sheaths 1604e. The illumination source 1600e further comprises at least one selvedge $1606_1e$-$1606_ne$ (hereinafter collectively referred to as "selvedges 1606e") coupled to the sheaths 1604e. In the illustrated embodiment, two selvedges 1606e are coupled laterally to the sheaths 1604e, one selvedge 1606e coupled to each sheath 1604e. Although the sheaths 1604e are illustrated as having semicircular cross sections, it will be appreciated that the use of a reflective strip 1608e is not limited by the shape of the sheaths' cross sections.

Figure 17A:
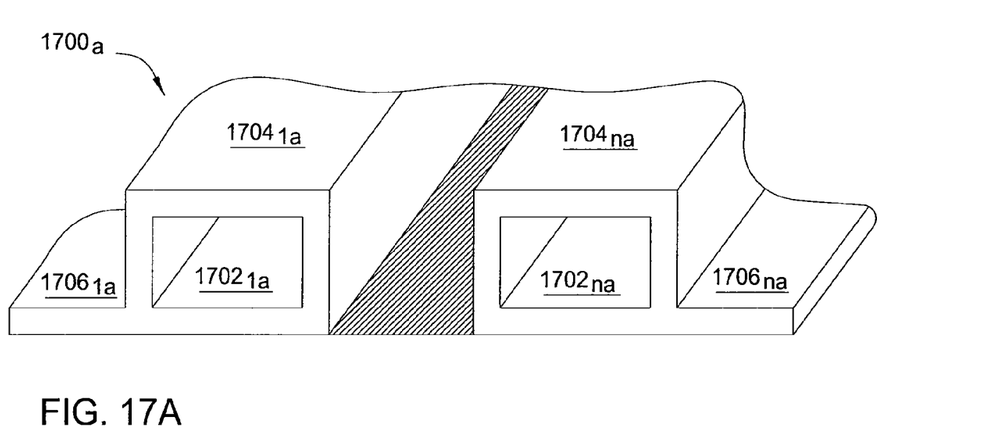
FIG. 17A illustrates a cross sectional view of another embodiment of an illumination source, according to the present invention.

FIG. 17A illustrates a cross sectional view of another embodiment of an illumination source 1700a, according to the present invention. In particular, FIG. 17A illustrates an illumination source 1700a comprising a compound sheath comprising at least two sheaths $1704_1a$-$1704_na$ (hereinafter collectively referred to as "sheaths 1704a"), each sheath 1704a having a rectangular cross section and housing a luminous core $1702_1a$-$1702_na$ (hereinafter collectively referred to as "cores 1702a"). In addition, a reflective strip 1708a is disposed between the sheaths 1704a and runs along at least part of the lengths of the sheaths 1704a. The illumination source 1700a further comprises at least one selvedge $1706_1a$-$1706_na$ (hereinafter collectively referred to as "selvedges 1706a") coupled to the sheaths 1704a. In the illustrated embodiment, two selvedges 1706a are coupled laterally to the sheaths 1704a, one selvedge 1706a coupled to each sheath 1704a.

Figure 17B:
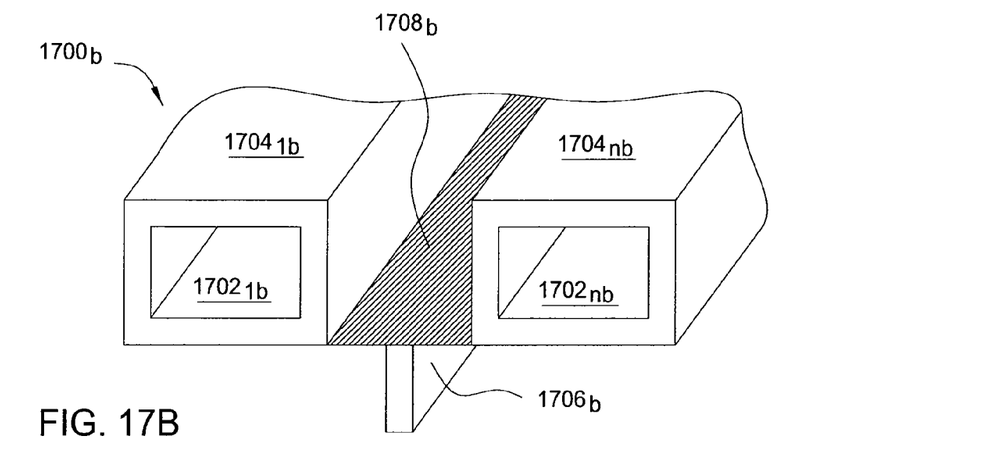
FIG. 17B illustrates a cross sectional view of a variation of the illumination source of FIG. 17A.

FIG. 17B illustrates a cross sectional view of a variation of the illumination source 1700a of FIG. 17A. In particular, FIG. 17B illustrates an illumination source 1700b comprising a compound sheath comprising at least two sheaths $1704_1b$-$1704_nb$ (hereinafter collectively referred to as "sheaths 1704b"), each sheath 1704b having a rectangular cross section and housing a luminous core $1702_1b$-$1702_nb$ (hereinafter collectively referred to as "cores 1702b"). In addition, a reflective strip 1708b is disposed between the sheaths 1704b and runs along at least part of the lengths of the sheaths 1704b. The illumination source 1700b further comprises at least one selvedge 1706b coupled to the sheaths 1704b. In the illustrated embodiment, a single vertical selvedge 1706b is coupled to the reflective strip 1708b, between the sheaths 1704b.

Figure 18A:
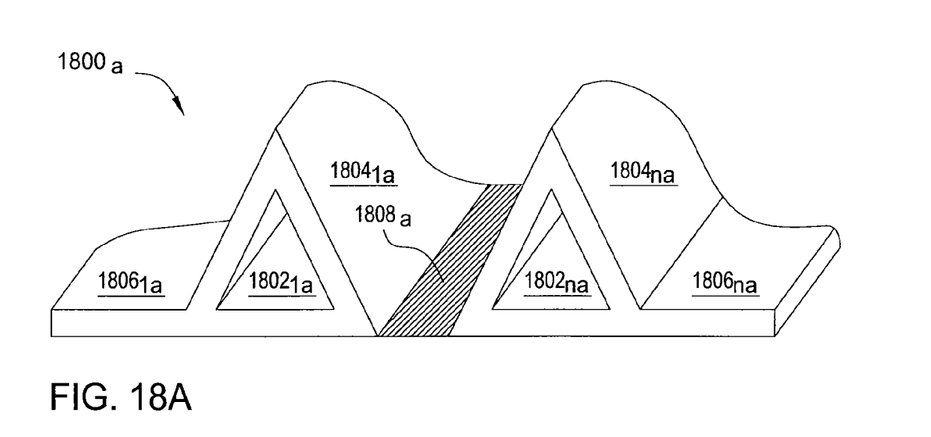
FIG. 18A illustrates a cross sectional view of another embodiment of an illumination source, according to the present invention.

FIG. 18A illustrates a cross sectional view of another embodiment of an illumination source 1800a, according to the present invention. In particular, FIG. 18A illustrates an illumination source 1800a comprising a compound sheath comprising at least two sheaths $1804_1a$-$1804_na$ (hereinafter collectively referred to as "sheaths 1804a"), each sheath 1804a having a triangular cross section and housing a luminous core $1802_1a$-$1802_na$ (hereinafter collectively referred to as "cores 1802a"). In addition, a reflective strip 1808a is disposed between the sheaths 1804a and runs along at least part of the lengths of the sheaths 1804a. The illumination source 1800a further comprises at least one selvedge $1806_1a$-$1806_na$ (hereinafter collectively referred to as "selvedges 1806a") coupled to the sheaths 1804a. In the illustrated embodiment, two selvedges 1806a are coupled laterally to the sheaths 1804a, one selvedge 1806a coupled to each sheath 1804a.

Figure 18B:
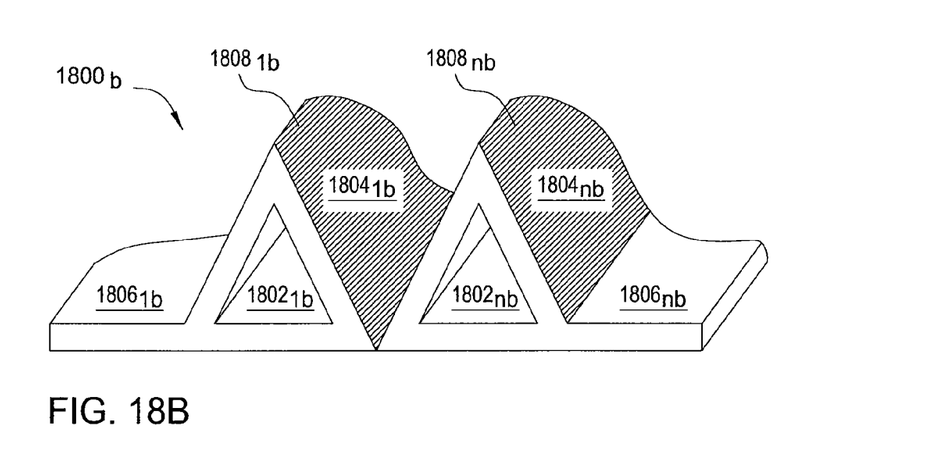
FIG. 18B illustrates a cross sectional view of a variation of the illumination source of FIG. 18A.

FIG. 18B illustrates a cross sectional view of a variation of the illumination source 1800a of FIG. 18A. As illustrated, the illumination source 1800 comprises a compound sheath comprising at least two individual sheaths $1804_1b$-$1804_nb$ (hereinafter collectively referred to as "sheaths 1804b"). The sheaths 1804b are coupled to each other, and each sheath 1804b has a substantially triangular cross section and defines a separate interior volume within which a luminous core $1802_1b$-$1802_nb$ (hereinafter collectively referred to as "cores 1802b") is housed. In addition, the illumination source 1800b comprises at least one selvedge $1806_1b$-$1806_nb$ (hereinafter collectively referred to as "selvedges 1806b"). In the illustrated embodiment, the selvedges 1806b are laterally coupled to the sheaths 1804b, one selvedge 1806b to each sheath 1804b. In addition, the illumination source 1800b comprises at least one reflective strip $1808_1b$-$1808_nb$ (hereinafter collectively referred to as "reflective strips 1808b"). In the illustrated embodiment, the reflective strips 1808b cover at least a portion of at least one exterior side of each sheath 1804b.

Figure 18C:
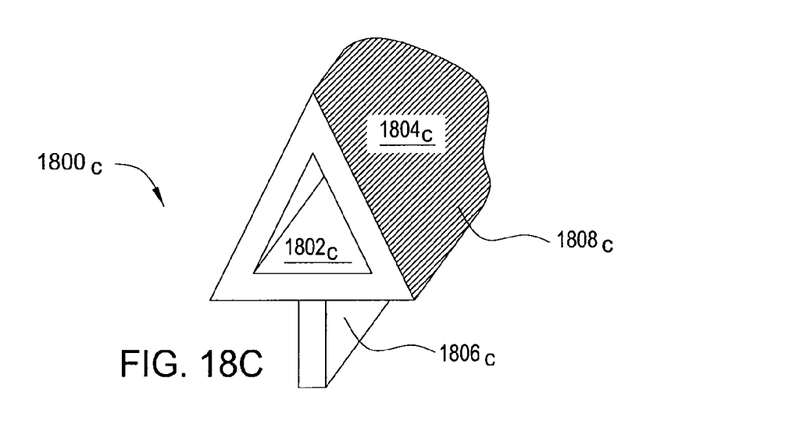
FIG. 18C illustrates a cross sectional view of a variation of the illumination source of FIG. 18A.

FIG. 18C illustrates a cross sectional view of a variation of the illumination source 1800a of FIG. 18A. In particular, FIG. 18C illustrates an illumination source 1800c comprising a sheath 1804c having a substantially triangular shaped cross section and containing a luminous core 1802c, and further comprising a selvedge or flange 1806c coupled to the sheath 1804c. In addition, the illumination source 1800c comprises at least one reflective strip 1808c. In the illustrated embodiment, the reflective strip 1808c covers at least a portion of at least one exterior side of the sheath 1804c.

Thus, the geometry of an illumination source according to the present invention may comprise any combination (in shape and quantity) of cross sections, sheaths, selvedges and reflective strips.

Figure 19:
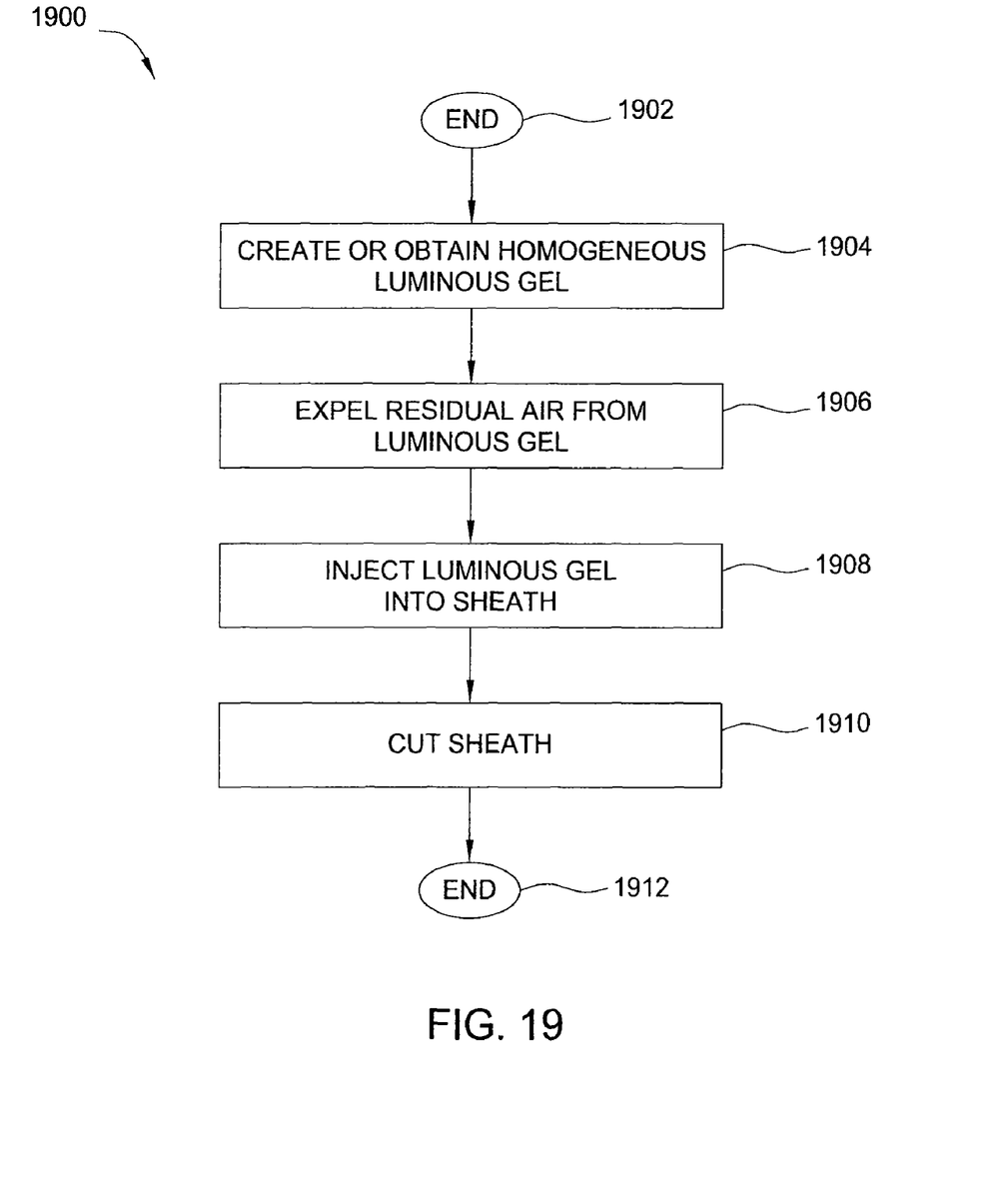
FIG. 19 is a flow diagram illustrating a method 1900 for forming an illumination source, according to one embodiment of the present invention.

FIG. 19 is a flow diagram illustrating a method 1900 for forming an illumination source, according to one embodiment of the present invention. The method 1900 is initialized at step 1902 and proceeds to step 1904, where a substantially homogeneous luminous gel medium is either obtained or created, e.g., to form the core of the illumination source. In one embodiment, the luminous gel is a phosphor gel comprising a mixture of phosphor powder, a viscous carrier and silicone oil. In one embodiment, the luminous gel contains at least one half a gram of phosphor powder and eighteen grams of carrier for every one liquid ounce of silicone oil, as described above. The specific materials comprising the phosphor powder, viscous carrier and silicone oil are any of the materials described previously herein. Silicone mixed with silicone oil facilitates lubricity or flow of non-Newtonian/high shear fluids (e.g., silicones) into small-diameter spaces (e.g., sheaths). The mixture of silicone and silicone oil also decreases the durometer (hardness) of the ultimately cured carrier, making the cured carrier more flexible. The silicone oil also increases the molecular surface are, and hence the reactivity sites, for silane/silicone polymerization, which decreases cure time. In addition, viscous silicone is easily mixed with phosphor to produce a substantially homogenous mixture having excellent light emission performance.

Light emission performance is also affected by the clarity of the carrier (and also by the clarity of the sheath). That is, the ability of light to efficiently penetrate the carrier (and sheath) so that the encapsulated phosphor can receive and absorb the light is directly related to clarity of the carrier (and sheath). The same is true of the ability of light emitted by the phosphor to penetrate the carrier (and sheath).

The homogeneity of the phosphor/carrier mixture also affects light emission performance, as a substantially equal, consistent and even particle dispersion of the phosphor powder in the carrier will promote even light distribution (and, hence, light emission).

In some embodiments, silicone RTV polymer mixed with silicone oil also optimizes manufacturing efficiency (e.g., injection length) and accelerates solid polymer cure in situ in the sheath. For instance, experimental results have shown that a mixture of approximately ⅔ ounce of silicone RTV polymer to approximately ⅓ ounce of silicone oil can be injected in a sheath having a length of approximately 100 feet and an inside diameter of approximately ⅛ inch. Other experimental results have shown that an approximately one-to-one ratio of silicone RTV polymer to silicone oil can also be used to advantage.

Moreover, experimental results have shown that phosphor loading of approximately half a gram to approximately twenty-five grams per liquid ounce of carrier can be achieved for sheath lengths of up to approximately 100 feet. The brightness of the illumination source is dependent in large part on the phosphor density/gram loading of phosphor per liquid ounce of carrier. In general, the greater the density of the phosphor, the greater the brightness of the illumination source.

Also dependent on the phosphor is the recharging efficiency of the illumination source. Specifically, recharging efficiency is tied to the type of phosphor powder. For example, strontium aluminate has a much longer afterglow persistence (e.g., approximately six to twenty hours) than zinc sulphite/copper (e.g., approximately thirty minutes), based on roughly the same amount of charge (e.g., approximately five minutes).

In one embodiment, where the luminous gel is created from raw materials, homogenous dispersion of the phosphor powder within the gel medium is accomplished using round stirring rods to mix the raw materials. The use of stirring rods substantially reduces the shearing and/or crushing of the phosphor powder crystals during mixing, maximizing ultimate light output.

In step 1906, residual air (e.g., in voids) is expelled from the luminous gel, for example by agitation and/or vibration. In one embodiment, residual air is expelled by at least one of: compressing the luminous gel to vent the air, gently agitating/vibrating the luminous gel, or allowing the luminous gel to stand to air and release. In another embodiment, residual air is expelled by compacting the luminous gel, e.g., within a centrifuge, to vent the air. In yet another embodiment, the luminous gel may be both compressed and compacted within a centrifuge to further ensure that air is substantially eliminated from the luminous gel.

In step 1908, the luminous gel mixture is injected into the sheath. In one embodiment, injection of the luminous gel is performed under pressure (e.g., using a hydraulic mechanism such as a pressure pot, a syringe, a ram, or pneumatic filling). In one embodiment, the sheath is disposed vertically or horizontally to allow gravity to aid in compressing the luminous gel within the sheath and in reducing or eliminating air voids within the sheath. In a further embodiment, release of residual air voids, as specified in step 1906, is facilitated by a tumbling effect induced during injection of the luminous gel mixture in step 1908. This tumbling effect is the result of the front head of the injection means being urged down the sheath, with resultant shear friction of the luminous gel mixture gripping the interior walls of the sheath.

In step 1910, the sheath is cut to a specified length, once the luminous gel has set, gelled, room temperature vulcanized, or cured in situ. In one embodiment, the luminous gel is allowed to cure in situ before the sheath is cut. The method 1900 is then terminated in step 1912.

In alternative embodiments, the core may be formed first, and the sheath formed over the core, for example by pultrusion (e.g., overcoating of a transparent material by pressure, overjacketing, bath dipping, flowing, or curtain coating). In other embodiments, the core and sheath may be formed simultaneously, for example by co-extrusion or co-injection molding.

In yet another embodiment, a flat panel illumination source may be formed by pouring or injecting the luminous gel mixture into or onto a tray surface or hollow cavity and allowing the luminous gel mixture to set in situ. Such illumination sources may be formed in large formats to create a large surface area for light emission.

For some applications, such as pet collars, the ends of the illumination source need to be joined or joinable. In one embodiment, permanent joins are formed by sonic welding or through the use of adhesives or solvents. In another embodiment, the ends of the illumination source are joined using magnets such as neodymium magnets in order to form a join that can be selectively undone (e.g., for "break away" pet collars). In one embodiment, a magnet is embedded in each end of the illumination source.

Thus, the present invention represents a significant advancement in the field of illumination sources. Embodiments of the invention provide an illumination source having almost limitless applications. The illumination source of the present invention is suitable for use in darkened conditions, where visibility may be diminished. The novel illumination source is also suitable for use in conditions where the illumination source may be subject to mechanical stresses and strains.

While the foregoing is directed to embodiments of the invention, other and further embodiments of the invention may be devised without departing from the basic scope thereof.

What is claimed is:

1. An illumination source, comprising:
   a resilient sheath; and
   a photoluminescent core housed within the sheath, the core comprising:
      a gel medium; and
      a photoluminescent phosphor powder suspended within the gel medium.

2. The illumination source of claim 1, wherein the sheath is transparent or translucent.

3. The illumination source of claim 1, wherein the sheath comprises a tube formed from at least one of: an elastomer, a polymer, a self-curing polymer, or a rubber.

4. The illumination source of claim 3, wherein the sheath is formed from at least one bioplastic.

5. The illumination source of claim 1, wherein the sheath is tinted.

6. The illumination source of claim 1, wherein the sheath includes one or more flame-retardant additives.

7. The illumination source of claim 1, wherein the sheath is impregnated with phosphor.

8. The illumination source of claim 1, wherein the sheath has a cross sectional shape approximating at least one of: a circle, a square, a rectangle, an ovoid, a semicircle, a convex compound curve, a concave compound curve, a flat panel, or a triangle.

9. The illumination source of claim 1, wherein the gel medium comprises at least one of: polyacrylamide acrylic, cross-linked polymer, mineral oil, hydrogel or cured silicone.

10. The illumination source of claim 1, wherein the phosphor powder comprises at least one of: magnesium strontium silicate, strontium aluminate, or nano-phosphor.

11. The illumination source of claim 1, wherein the core further comprises one or more litrosphere additives.

12. The illumination source of claim 1, wherein the core is tinted.

13. The illumination source of claim 1, wherein the core comprises at least approximately 0.5 grams of the phosphor powder for approximately every one liquid ounce of the gel medium.

14. The illumination source of claim 1, wherein the core comprises approximately eighty-seven to ninety percent phosphor powder and approximately ten to thirteen percent gel medium per liquid ounce of the core.

15. The illumination source of claim 1, wherein the sheath and core form a substantially tubular, elongated body having a first end and a second end.

16. The illumination source of claim 15, wherein the first end and the second end are joined by at least one of: a sonic weld, an adhesive, a solvent, or one or more magnets.

17. The illumination source of claim 1, wherein the sheath and core form a substantially flat panel.

18. The illumination source of claim 1, further comprising:
   at least one selvedge coupled to the sheath.

19. The illumination source of claim 1, further comprising:
   at least one reflective surface coupled to the sheath.

* * * * *